(12) United States Patent
Das et al.

(10) Patent No.: US 12,162,466 B1
(45) Date of Patent: Dec. 10, 2024

(54) METHODS, SYSTEMS, APPARATUS, AND ARTICLES OF MANUFACTURE TO CONTROL A VEHICLE BASED ON SIGNAL BLENDING

(71) Applicant: Ford Global Technologies, Dearborn, MI (US)

(72) Inventors: Ashrit Das, Canton, MI (US); Joshua Guerra, Farmington Hills, MI (US); Benjamin James Northrup, Bloomfield Hills, MI (US); Lodewijk Maarten Erik Wijffels, Northville, MI (US); Ziyu Ke, Ypsilanti, MI (US); Ronald Loyd Chadwick, Redford, MI (US); Yijun Li, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/524,858

(22) Filed: Nov. 30, 2023

(51) Int. Cl.
| | | |
|---|---|---|
| *B60W 10/06* | (2006.01) | |
| *B60W 40/072* | (2012.01) | |
| *B60W 40/105* | (2012.01) | |
| *B60W 40/114* | (2012.01) | |
| *B60W 50/00* | (2006.01) | |

(52) U.S. Cl.
CPC .......... *B60W 10/06* (2013.01); *B60W 40/072* (2013.01); *B60W 40/105* (2013.01); *B60W 40/114* (2013.01); *B60W 50/0098* (2013.01); *B60W 2050/0008* (2013.01); *B60W 2050/0054* (2013.01); *B60W 2520/14* (2013.01); *B60W 2552/30* (2020.02); *B60W 2710/0666* (2013.01)

(58) Field of Classification Search
CPC .. B60W 10/06; B60W 40/072; B60W 40/105; B60W 40/114; B60W 50/0098; B60W 2552/30; B60W 2050/0008; B60W 2050/0054; B60W 2520/14; B60W 2710/0666
USPC .......................................................... 701/54
See application file for complete search history.

(56) References Cited

U.S. PATENT DOCUMENTS

| | | | |
|---|---|---|---|
| 6,292,759 | B1 | 9/2001 | Schiffmann |
| 9,821,800 | B2 | 11/2017 | Yamakado et al. |
| 10,065,639 | B2 | 9/2018 | Taniguchi |
| 10,099,720 | B2 | 10/2018 | Ramanujam et al. |
| 2004/0186644 | A1* | 9/2004 | McClure .............. G05D 1/0278 701/41 |
| 2007/0185639 | A1* | 8/2007 | Osborn ............... B60T 8/17616 701/71 |
| 2016/0121883 | A1* | 5/2016 | Mao ..................... B60W 30/02 180/65.265 |

* cited by examiner

*Primary Examiner* — Colby M Hansen
(74) *Attorney, Agent, or Firm* — Lorne Forsythe; Hanley, Flight & Zimmerman, LLC

(57) ABSTRACT

Methods, systems, apparatus, and articles of manufacture to control a vehicle based on signal blending are disclosed. An example apparatus disclosed herein includes programmable circuitry at least determine a first yaw rate signal based on first signal data output by a yaw rate sensor of a vehicle, determine a second yaw rate signal based on second signal data output by a steering wheel angle sensor of the vehicle, determine a blended yaw rate signal based on the first yaw rate signal and the second yaw rate signal, and adjust a torque to be applied by a motor of the vehicle based on the blended yaw rate signal.

20 Claims, 9 Drawing Sheets

METHODS, SYSTEMS, APPARATUS, AND ARTICLES OF MANUFACTURE TO CONTROL A VEHICLE BASED ON SIGNAL BLENDING

FIELD OF THE DISCLOSURE

This disclosure relates generally to vehicle steering and, more particularly, to methods, systems, apparatus, and articles of manufacture to control a vehicle based on signal blending.

BACKGROUND

In recent years, vehicles have become increasingly automated. Some vehicles include automated control systems to control and/or facilitate one or more operations (e.g., steering, accelerating, braking, etc.) of the vehicle. Some vehicle control systems are communicatively coupled to one or more sensors (e.g., accelerometers, transducers, etc.) of the vehicle, and the vehicle control systems can measure and/or monitor characteristics (e.g., yaw rate, steering wheel angle, acceleration, etc.) associated with the vehicle based on sensor data from the sensors. Based on the sensor data, the vehicle control systems can generate one or more control signals and transmit the control signals to operable control assemblies (e.g., valves, actuators, motors, etc.) of the vehicle to facilitate operation thereof.

Figure 1:
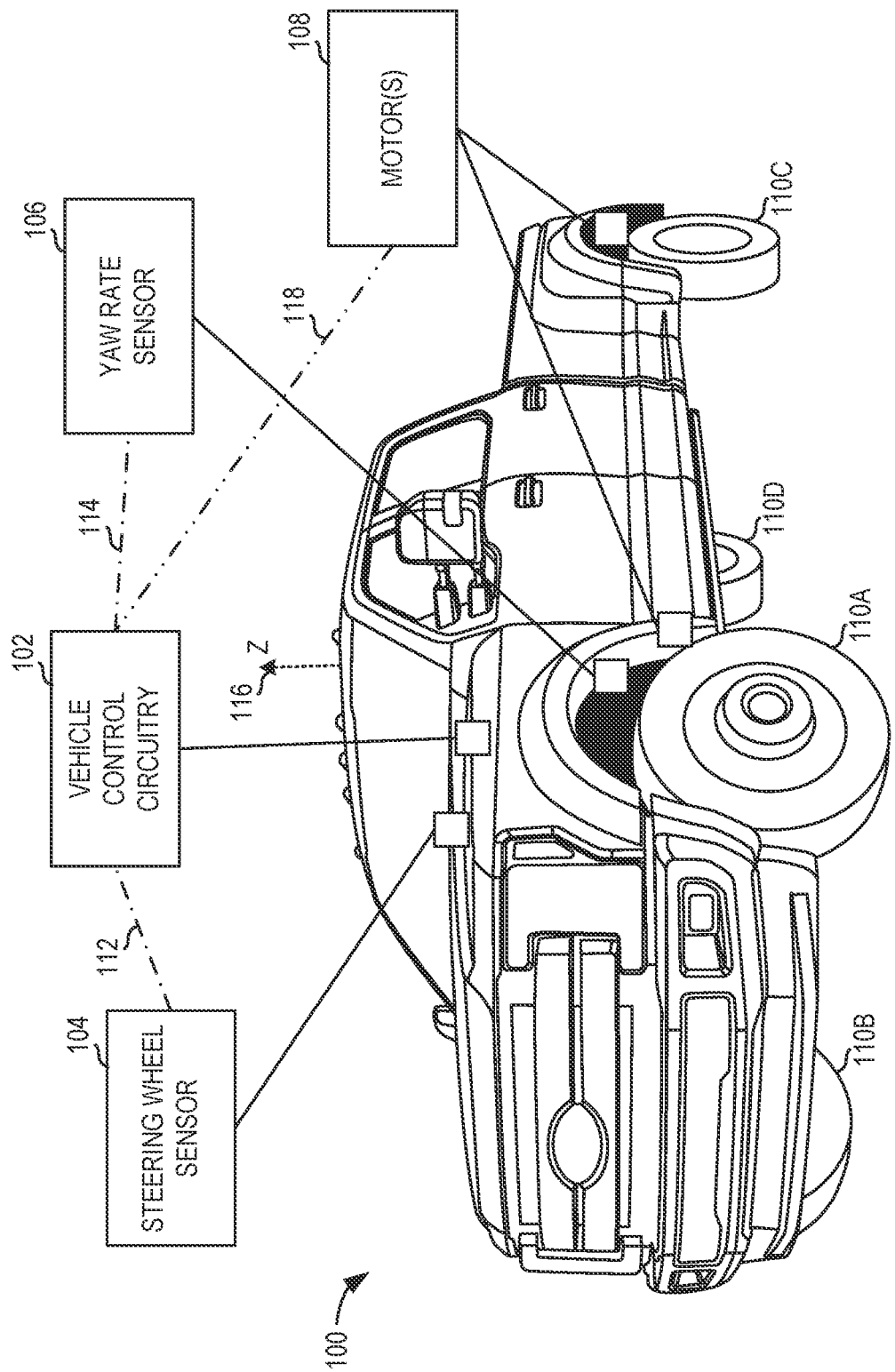
FIG. 1 is a perspective view of a vehicle in which examples disclosed herein can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Automation of vehicles is commercially desirable because automation can improve the accuracy with which operations (e.g., steering, accelerating, braking, etc.) are performed, reduce operator fatigue, improve efficiency, and/or accrue other benefits. Some vehicles include automated control systems to facilitate and/or control the one or more operations of the vehicle. For instance, an automated steering system (e.g., a lane centering system, a lateral motion controller (LMC), etc.) can be used to control and/or adjust steering of the vehicle to facilitate lane changing, keep the vehicle centered in a lane, perform evasive maneuvers, etc. In some instances, the automated steering system controls the steering by generating and/or providing control signals to one or more control devices (e.g., motors, actuators, valves, etc.) implemented by the vehicle. Such control signals can be used, for instance, to adjust a torque applied by one or more motors, engage and/or disengage a brake, adjust a wheel angle of one or more wheels, etc.

In some instances, the steering system can generate the control signals based on sensor data (e.g., signal data) output by one or more sensors communicatively coupled to the steering system. The sensor data can include, for instance, steering wheel angle data from a steering wheel sensor, yaw rate data from a yaw rate sensor, speed and/or acceleration data (e.g., lateral and/or longitudinal acceleration data) from an accelerometer, etc. The sensor data can be provided as feedback to a controller (e.g., a closed loop controller, a feedback control loop) implemented by the steering system, where the controller generates and/or adjusts the control signals based on the feedback.

In some cases, a curvature discrepancy (e.g., a difference between an actual path of the vehicle and a projected curved path of the vehicle) can be calculated by the controller and/or used to generate the control signal(s) for steering the vehicle. In some cases, yaw rate information (e.g., an angular rotation rate of the vehicle about a vertical axis of the vehicle) can be provided as feedback to the controller to calculate the curvature discrepancy. For instance, steering wheel angle data can be used to approximate the yaw rate of the vehicle. Because the steering wheel angle data is measured and/or transmitted internally within the steering system, the steering wheel angle data can be obtained at a relatively high frequency and/or reduced latency. As such, the steering wheel angle data can be used to accurately predict and/or represent motion of the vehicle when the vehicle is in a linear steering range and/or traveling on a relatively flat surface (e.g., a surface having few or no protrusions or irregularities). However, the steering wheel angle data may not accurately represent (e.g., may vary from) the vehicle motion when the vehicle is traveling along uneven and/or slippery surfaces, when there are other external forces acting on the vehicle, etc.

Alternatively, the yaw rate can be obtained from a yaw rate sensor of the vehicle, where the yaw rate sensor measures an actual yaw rate (e.g., a measured yaw rate) of the vehicle. In some cases, the measured yaw rate can be more representative of the actual vehicle motion (e.g., compared to the steering wheel angle data). However, because the yaw rate sensor is typically implemented separate from the steering system, there may be delays associated with transmission and/or filtering of the measured yaw rate signal, and/or the measured yaw rate signal may include more noise compared to the steering wheel angle data. Such noise and/or delays can reduce responsiveness of the measured yaw rate signal to relatively quick disturbances (e.g., frost heave, road protrusions, etc.) acting on the vehicle.

During travel, the vehicle may encounter disturbances in the road such as frost heave, protrusions, uneven surfaces, and/or other irregularities. Such disturbances may reduce reliability of the measured and/or estimated yaw rate values, resulting in unintended oscillations in the control signal values generated by the controller. For instance, when one or more wheels of the vehicle encounter a disturbance while the vehicle is travelling along a curve, contact between the wheel(s) and the ground may be temporarily lost or reduced. During the reduced and/or loss of contact, a steering wheel and, thus, the wheel(s) of the vehicle may continue to turn in a direction of the curve, while normal forces on the wheel(s) from the ground are reduced. As a result, a measured yaw rate of the vehicle may be temporarily reduced, causing the controller to request, via the control signal(s), additional torque to be applied in a first direction by one or more motors of the vehicle. However, once the contact and/or the normal forces are restored between the wheel(s) and the ground, the increase in steering wheel angle and/or the increase in normal forces may result in an increase in the measured yaw rate. In such cases, the controller may request the motor(s) to apply the torque in a second direction to correct for the increased measured yaw rate. In some cases, because of signal delays and/or threshold rates (e.g., rate limits) at which the torque can be adjusted for the motor(s), the control signal(s) and/or the requested torque values may oscillate for a period of time before an intended operation and/or steering direction of the vehicle is achieved. Such oscillation can be felt by a passenger of the vehicle and may result in a poor riding experience and/or reduced comfort for the passenger.

Examples disclosed herein perform frequency-based blending of two or more signals representative of a yaw rate of the vehicle, and utilize the blended signal to control one or more example operations (e.g., steering) of the vehicle. Example vehicle control circuitry disclosed herein accesses and/or obtains first example signal data from an example yaw rate sensor of the vehicle and second example signal data from an example steering wheel angle sensor of the vehicle. In some examples, the first signal data is representative of a measured yaw rate of the vehicle, and the second signal data is representative of a calculated yaw rate (e.g., an estimated yaw rate) of the vehicle. Examples disclosed herein select, based on at a road curvature along a projected path of the vehicle and/or based on a threshold speed of the vehicle, an example threshold frequency (e.g., a crossover frequency) for frequency-based filtering of the first and second signal data. In some examples, the vehicle control circuitry applies a first filter (e.g., a low pass filter) to the first signal data to pass low-frequency components (e.g., signal components at or below the threshold frequency) and attenuate high-frequency components (e.g., signal components above the threshold frequency) of the first signal data. Conversely, the vehicle control circuitry applies a second filter (e.g., a high pass filter) to the second signal data to pass the high-frequency components and attenuate the low-frequency components of the second signal data. In some examples, the vehicle control circuitry blends (e.g., adds, combines) the filtered first and second signals to generate an example blended yaw rate signal. In some examples, the blended yaw rate signal is provided as feedback to an example control system (e.g., a closed loop controller, a feedback control loop) of the vehicle, and the control system can generate and/or adjust one or more example control signals based on the feedback. Such control signals can be used to adjust a direction and/or magnitude of torque applied by the motor(s) to perform lane centering and/or other lateral control operations.

Advantageously, by blending signal data from both a yaw rate sensor and a steering wheel angle sensor, examples disclosed herein can more accurately represent the motion (e.g., the yaw rate) of a vehicle (e.g., compared to when the yaw rate sensor data or the steering wheel angle data is used alone). In particular, blending of the signal data may reduce the effects of measurement noise and/or transmission delays on the resulting blended signal. Moreover, by generating one or more control signals based on the blended signal, examples disclosed herein may reduce unnecessary oscillation in the control signal(s) in the event of an external disturbance (e.g., contact with frost heave, road bumps and/or protrusions, etc.) to the vehicle. By reducing such oscillations in the control signal(s), examples disclosed herein may reduce power utilized by one or more motors of the vehicle, and/or may improve comfort and/or provide a smoother ride for passengers of the vehicle.

FIG. 1 is a perspective view of a vehicle 100 in which examples disclosed herein can be implemented. In the illustrated example of FIG. 1, the vehicle 100 implements example vehicle control circuitry 102 in accordance with teachings of this disclosure. In this example, the vehicle 100 further includes an example steering wheel sensor 104, an example yaw rate sensor 106, and one or more example motors 108 operatively coupled to respective wheels 110 (e.g., including front wheels 110A, 110B and/or rear wheels 110C, 110D) of the vehicle 100.

The vehicle 100 is a motorized wheel-driven vehicle. In the illustrated example of FIG. 1, the vehicle 100 is a pick-up truck. In other examples, the vehicle 100 can be any type of wheeled vehicle (e.g., a sedan, a coupe, a van, a sports utility vehicle, an all-terrain vehicle (ATV), an agricultural vehicle, etc.). In some examples, the vehicle 100 includes an internal combustion engine (e.g., a non-electrified vehicle, a partially electrified vehicle, etc.). In other examples, the vehicle 100 is a fully electric vehicle.

In the example of FIG. 1, the steering wheel sensor 104 and the yaw rate sensor 106 are communicatively coupled to the vehicle control circuitry 102 to provide example sensor data (e.g., sensor signal data) thereto. In some examples, the steering wheel sensor 104 is implemented on an example steering system of the vehicle 100, where the steering system is to translate rotational motion of a steering wheel of the vehicle 100 into a pivoting motion of one or more of the wheels 110. In some examples, the steering system includes a mechanical linkage (e.g., a rack and pinion system and/or a steering column) to operatively couple the steering wheel to the one(s) of the wheels 110. In some examples, the steering system can be a steer-by-wire system and/or a partially steer-by-wire system. In some examples, the steering system can include any suitable type of powered steering and/or steering assist (e.g., electric, hydraulic, hybrid electro-hydraulic systems, etc.). In the illustrated example of FIG. 1, the steering wheel sensor 104 measures and/or detects an example steering wheel angle of the steering wheel, and provides and/or transmits the measured steering wheel angle as example steering wheel angle data (e.g., steering wheel sensor data) 112 to the vehicle control circuitry 102. In some examples, the steering wheel angle data 112 includes positions (e.g., angular positions) of the steering wheel, a rotation rate of the steering wheel, etc.

In the illustrated example of FIG. 1, the yaw rate sensor 106 measures and/or detects an example yaw rate of the vehicle 100, where the yaw rate represents a rotation rate (e.g., an angular velocity) of the vehicle 100 with respect to an example yaw axis 116 of the vehicle 100. In some examples, the yaw rate sensor 106 provides and/or transmits the measured yaw rate as example yaw rate sensor data (e.g., measured yaw rate data, measured yaw rate signal data) 114 to the vehicle control circuitry 102.

In the example of FIG. 1, the motor(s) 108 are operatively coupled to respective one(s) of the wheels 110 to adjust a wheel angle thereof. For example, the motor(s) 108 can apply torque to the wheel(s) 110 in a first direction to rotate and/or pivot the wheel(s) 110 clockwise relative to an example yaw axis 116 of FIG. 1, thus steering the vehicle 100 in a rightward direction of the vehicle 100. Conversely, the motor(s) 108 can apply torque to the wheel(s) 110 in a second direction (e.g., opposite to the first direction) to rotate and/or pivot the wheel(s) 110 counterclockwise relative to the yaw axis 116 of FIG. 1, thus steering the vehicle 100 in a leftward direction of the vehicle 100. In some examples, a direction and/or magnitude of the torque applied by the motor(s) 108 can be adjusted and/or controlled based on one or more example control signals (e.g., torque control signals) 118 received and/or obtained from the vehicle control circuitry 102.

In the example of FIG. 1, the vehicle control circuitry 102 generates, based on the steering wheel angle data 112 and/or the yaw rate sensor data 114, the example control signal(s) 118 for controlling the respective motor(s) 108. While the control signal(s) 118 are used to control the motor(s) 108 in this example, the vehicle control circuitry 102 can additionally or alternatively generate one or more control signals to control, for example, one or more other control devices (e.g., brakes, actuators, valves, etc.) of the vehicle 100. In some examples, the vehicle control circuitry 102 generates the control signal(s) 118 based on an example blended yaw rate (e.g., a frequency-based blended yaw rate) determined based on the steering wheel angle data 112 and the yaw rate sensor data 114.

Figure 2:
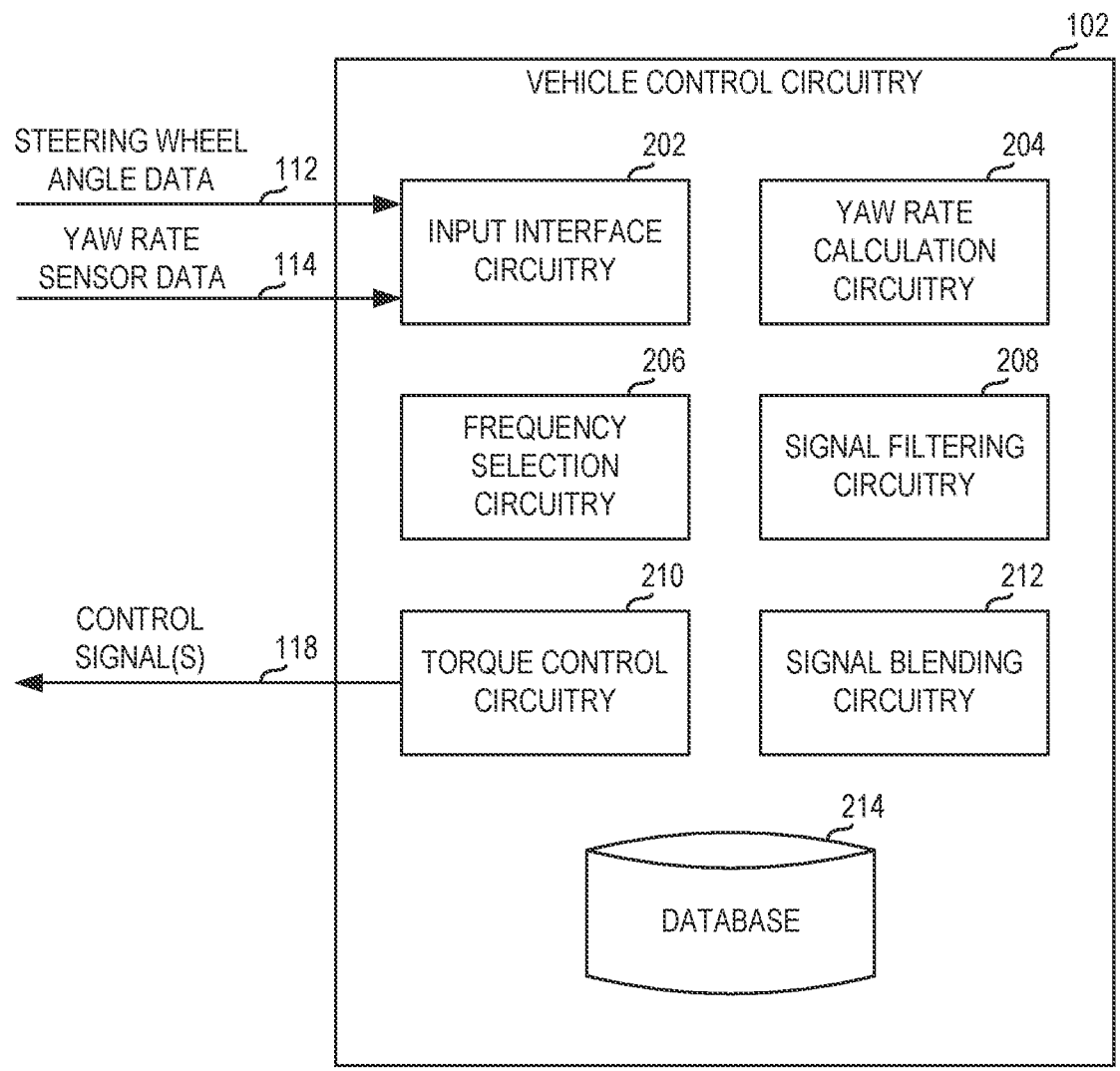
FIG. 2 is a block diagram of an example implementation of the example vehicle control circuitry of FIG. 1.

FIG. 2 is a block diagram of an example implementation of the vehicle control circuitry 102 of FIG. 1. The vehicle control circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the vehicle control circuitry 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the illustrated example of FIG. 2, the vehicle control circuitry 102 includes example input interface circuitry 202, example yaw rate calculation circuitry 204, example frequency selection circuitry 206, example signal filtering circuitry 208, example torque control circuitry 210, example signal blending circuitry 212, and an example database 214.

The example database 214 of FIG. 2 stores data utilized, generated, and/or obtained by the vehicle control circuitry 102. The example database 214 of FIG. 2 is implemented by any memory, storage device and/or storage disc for storing data such as, for example, flash memory, magnetic media, optical media, solid state memory, hard drive(s), thumb drive(s), etc. Furthermore, the data stored in the example database 214 may be in any data format such as, for example, binary data, comma delimited data, tab delimited data, structured query language (SQL) structures, etc. While, in the illustrated example, the example database 214 is illustrated as a single device, the example database 214 and/or any other data storage devices described herein may be implemented by any number and/or type(s) of memories.

The example input interface circuitry 202 receives, accesses, and/or obtains example input data to be utilized by the vehicle control circuitry 102. For example, the input interface circuitry 202 obtains the example steering wheel angle data 112 from the example steering wheel sensor 104 of FIG. 1, and/or obtains the example yaw rate sensor data 114 from the example yaw rate sensor 106 of FIG. 1. In some examples, the yaw rate sensor data 114 includes a second example signal representative of measured yaw rate values over time, and the steering wheel angle data 112 includes a second example signal representative of measured steering wheel angle values over time. In some examples, the input interface circuitry 202 accesses and/or obtains the steering wheel angle data 112 and/or the yaw rate sensor data 114 periodically, where the steering wheel angle data 112 and the yaw rate sensor data 114 can be associated with different transmission delays and/or latencies. In some examples, the input interface circuitry 202 provides the steering wheel angle data 112 and/or the yaw rate sensor data 114 to the database 214 for storage therein. In some examples, the input interface circuitry 202 is instantiated by programmable circuitry executing input interface circuitry instructions and/or configured to perform operations such as those represented by the flowchart of FIG. 5.

The yaw rate calculation circuitry 204 calculates and/or determines yaw rates for the vehicle 100 based on the steering wheel angle data 112 and/or the yaw rate sensor data 114. For example, the yaw rate calculation circuitry 204 determines a first example yaw rate signal (e.g., a measured yaw rate signal, an actual yaw rate signal) corresponding to the first signal from the yaw rate sensor data 114 representative of the measured yaw rates over time. In some examples, the yaw rate calculation circuitry 204 determines a second example yaw rate signal (e.g., a calculated yaw rate signal, an estimated yaw rate signal) based on the steering wheel angle data 112. For example, the yaw rate calculation circuitry 204 estimates and/or determines the second yaw rate signal values for the vehicle 100 based on the steering wheel angle values from the steering wheel angle data 112 and/or based on one or more vehicle parameters of the vehicle 100. For example, the vehicle parameters can include a wheelbase of the vehicle 100, a travel speed of the vehicle 100, a mass of the vehicle 100, measurements of vehicle parts (e.g., the wheels 110) of the vehicle 100, distances between relative areas of the vehicle 100, etc. In some examples, the yaw rate calculation circuitry 204 utilizes a bicycle model to estimate and/or determine the second yaw rate signal values based on the steering wheel angle data 112. In some examples, the yaw rate calculation circuitry 204 is instantiated by programmable circuitry executing yaw rate calculation circuitry instructions and/or configured to perform operations such as those represented by the flowchart of FIG. 5.

The frequency selection circuitry 206 of FIG. 2 selects an example threshold frequency (e.g., a crossover frequency) for performing frequency-based filtering of the measured and calculated yaw rate signals. For example, the frequency selection circuitry 206 can select the threshold frequency based on threshold yaw rate (e.g., a maximum yaw rate) expected along a projected path of the vehicle 100. In some examples, the frequency selection circuitry 206 determines the expected threshold yaw rate based on a road curvature along the projected path and/or based on a threshold speed (e.g., a posted speed limit) along the projected path. In some examples, the threshold frequency may be constant (e.g., not changing), and/or the threshold frequency may vary over time (e.g., as the vehicle 100 travels along the projected path). For example, the frequency selection circuitry 206 can periodically evaluate the expected threshold yaw rate at respective different locations along the projected path. In some such examples, when the vehicle 100 is at the respective different locations, the frequency selection circuitry 206 adjusts the threshold frequency based on the corresponding expected threshold yaw rates. In some examples, the frequency selection circuitry 206 selects the threshold frequency based on a combination (e.g., an average) of the different threshold frequencies and/or the expected threshold yaw rates.

In some examples, the frequency selection circuitry 206 selects the threshold frequency based on empirical data (e.g., testing and/or validation results) associated with one or more vehicles. In some examples, the one or more vehicles can be the same vehicle type (e.g., model) as the vehicle 100 of FIG. 1, and/or can include different vehicle types. In some examples, the empirical data can include historical threshold frequency values selected for the one or more vehicles, historical control signals generated based on the corresponding historical threshold frequency values, and/or other performance metrics associated with the one or more vehicles. In some examples, the frequency selection circuitry 206 can select the threshold frequency based on an output of an example machine learning model trained based on the empirical data.

In some examples, the frequency selection circuitry 206 evaluates the historical control signals and/or the performance metrics based on one or more example performance thresholds to select the threshold frequency. For example, the frequency selection circuitry 206 can evaluate one or more example signal characteristics (e.g., a number of oscillations present in the historical control signals, duration(s) associated with the oscillations, amplitude(s) associated with the oscillations, etc.) of the historical control signals, where the signal characteristics are representative of performance of the corresponding vehicle(s) in response to encountering an obstacle (e.g., frost heave) and/or entering a curve. In some examples, the frequency selection circuitry 206 selects the threshold frequency corresponding to one(s) of the historical control signals for which the signal characteristics satisfy the performance threshold(s) (e.g., indicate satisfactory performance of the vehicle(s) in response to encountering an obstacle and/or entering a curve). In some examples, the frequency selection circuitry 206 selects the threshold frequency corresponding to the one(s) of the historical control signals for which the number of the oscillations satisfies (e.g., is less than) a threshold number, the duration of the oscillations satisfies (e.g., is less than) a threshold duration, and/or the amplitude(s) satisfy (e.g., are less than) a threshold amplitude. In some examples, the frequency selection circuitry 206 provides the selected threshold frequency to the database 214 for storage therein. For example, the frequency selection circuitry 206 can generate and/or update an example lookup table (e.g., a one-dimensional static lookup table) representing selected values of the threshold frequency for respective different velocities of the vehicle 100. In some examples, the frequency selection circuitry 206 can utilize the lookup table for selection of the threshold frequency based on velocity of the vehicle 100. In some examples, the frequency selection circuitry 206 is instantiated by programmable circuitry executing frequency selection circuitry instructions and/or configured to perform operations such as those represented by the flowchart of FIG. 5.

The example signal filtering circuitry 208 of FIG. 2 filters the measured yaw rate signal (e.g., from the yaw rate sensor 106) and/or the calculated yaw rate signal (e.g., from the steering wheel sensor 104) based on the selected threshold frequency. For example, the signal filtering circuitry 208 applies a first example filter (e.g., a low pass filter) to the measured yaw rate signal and applies a second example filter (e.g., a high pass filter) to the calculated yaw rate signal, where the first and second filters correspond to the selected threshold frequency. In some examples, the first filter passes (e.g., enables) first example signal components of the measured yaw rate signal that are below the threshold frequency, and the first filter attenuates (e.g., reduces, removes) second example signal components of the measured yaw rate signal that are at or above the threshold frequency. Conversely, the second filter attenuates third example signal components of the calculated yaw rate signal that are below the threshold frequency, and the second filter passes fourth example signal components of the calculated yaw rate signal that are at or above the threshold frequency. In some examples, the first filter corresponds to a low pass filter (e.g., an infinite impulse response (IIR) low pass filter), and the second filter corresponds to a high pass filter (e.g., an IIR high pass filter). In some examples, one or more different types of filters can be used for at least one of the first filter or the second filter. For example, at least one of a the first filter or the second filter can include a notch filter, a bandpass filter, etc.

In some examples, as a result of applying the first and second filters to the respective measured and calculated yaw rate signals, the signal filtering circuitry 208 outputs a first example filtered yaw rate signal (e.g., a filtered measured yaw rate signal, a low-frequency signal) corresponding to the measured yaw rate signal, and a second example filtered signal (e.g., a filtered calculated yaw rate signal, a high-frequency signal) corresponding to the calculated yaw rate signal. In some examples, the signal filtering circuitry 208 is instantiated by programmable circuitry executing signal filtering circuitry instructions and/or configured to perform operations such as those represented by the flowchart of FIG. 5.

The example signal blending circuitry 212 generates an example blended signal (e.g., a blended yaw rate signal) based on the first and second filtered signals. For example, the signal blending circuitry 212 blends (e.g., combines, adds together) the first and second filtered signals to generate and/or output the blended signal. In some examples, the blended signal includes example high-frequency signal components (e.g., signal components at or above the threshold frequency) from the measured yaw rate signal and example low-frequency components (e.g., signal components below the threshold frequency) from the calculated yaw rate signal. In some examples, the signal blending circuitry 212 is instantiated by programmable circuitry executing signal blending circuitry instructions and/or configured to perform operations such as those represented by the flowchart of FIG. 5.

The example torque control circuitry 210 generates and/or outputs the example control signal(s) 118 based on the blended signal. For example, the torque control circuitry 210 inputs and/or provides the blended signal as an example feedback signal to an example closed-loop controller (e.g., a feedback loop controller) implemented by the torque control circuitry 210. In some examples, the torque control circuitry 210, via the closed-loop controller, calculates a discrepancy value (e.g., a curvature discrepancy) based on difference(s) between the feedback signal and a desired and/or expected yaw rate of the vehicle 100, where the desired and/or expected yaw rate is based on the road curvature of the projected path of the vehicle 100. In some such examples, the torque control circuitry 210 generates and/or adjusts the control signal(s) 118 based on the calculated discrepancy value. In some examples, the torque control circuitry 210 provides and/or transmits the control signal(s) 118 to respective one(s) of the example motor(s) 108 of FIG. 1 and/or to one or more other example devices (e.g., actuator(s), valve(s), brake(s), etc.) of the vehicle 100. In some examples, based on the control signal(s) 118, the torque control circuitry 210 can adjust a direction and/or a magnitude of torque applied by the motor(s) 108 on respective one(s) of the wheels 110 of the vehicle 100. In some examples, the torque control circuitry 210 is instantiated by programmable circuitry executing torque control circuitry instructions and/or configured to perform operations such as those represented by the flowchart of FIG. 5.

Figure 3:
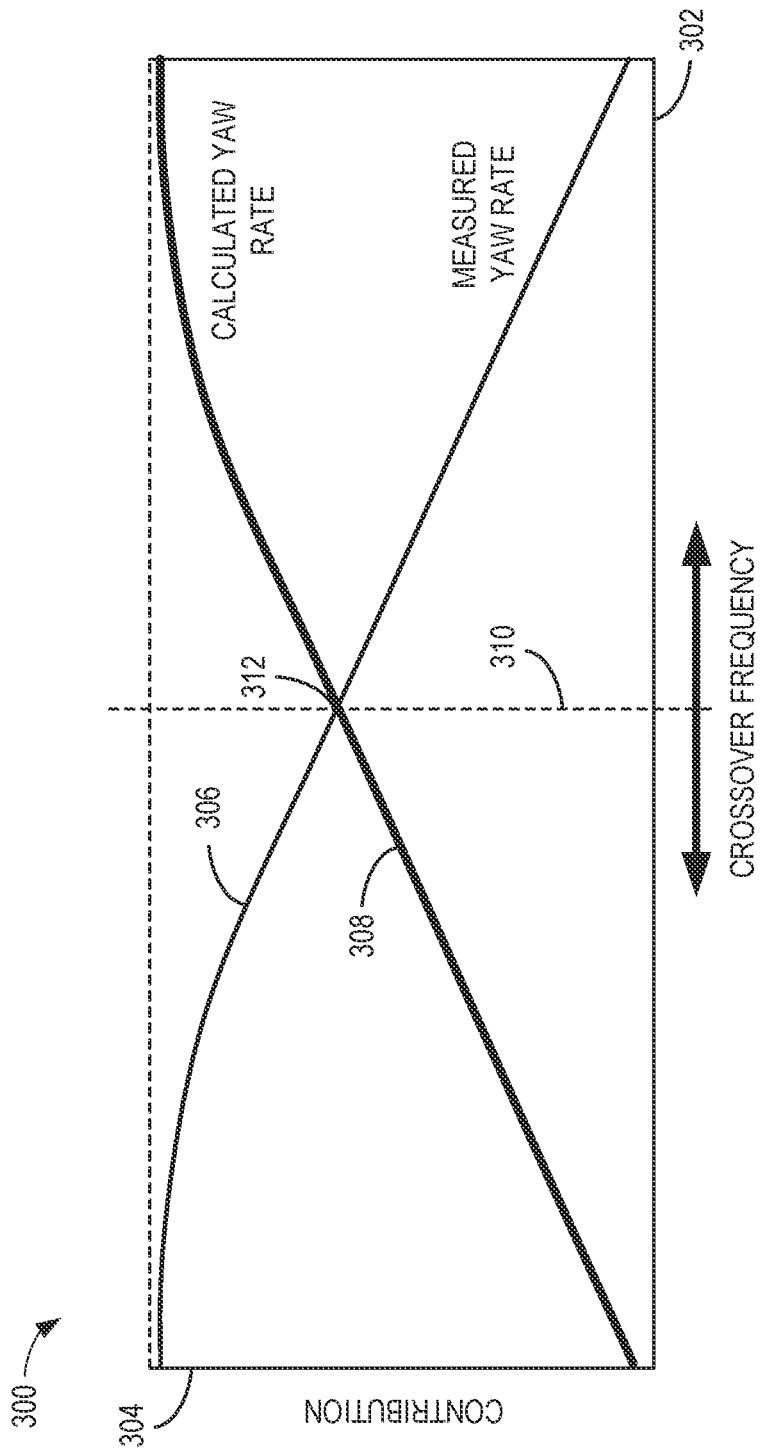
FIG. 3 is an example graph representing selection of an example threshold frequency by the example vehicle control circuitry of FIGS. 1 and/or 2.

FIG. 3 is an example graph 300 representing selection of the example threshold frequency (e.g., the crossover frequency) by the example vehicle control circuitry 102 of FIGS. 1 and/or 2. In the illustrated example of FIG. 3, the graph 300 includes a first example axis (e.g., a horizontal axis) 302 representative of candidate values (e.g., frequency values) for the threshold frequency, and a second example axis (e.g., a vertical axis) 304 representative of an amount (e.g., a percentage, a proportion) of contribution of a signal (e.g., the measured yaw rate signal and/or the calculated yaw rate signal) with respect to the blended signal (e.g., the feedback signal). In this example, the graph 300 includes a first example line 306 representing first example contribution amounts of the measured yaw rate signal at respective values of the threshold frequency, and a second example line 308 representing second example contribution amounts of the calculated yaw rate signal at the respective values of the threshold frequency. Further, the graph 300 includes an example vertical line 310 representative of the selected threshold frequency.

In the illustrated example of FIG. 3, when the selected threshold frequency is increased (e.g., the vertical line 310 is shifted rightward in FIG. 3), a first contribution amount of the measured yaw rate signal (e.g., represented by the first line 306) decreases while a second contribution amount of the calculated yaw rate signal (e.g., represented by the second line 308) increases. Conversely, when the selected threshold frequency is reduced (e.g., the vertical line 310 is shifted leftward in FIG. 3), the first contribution amount of the measured yaw rate signal increases while the second contribution amount of the calculated yaw rate signal decreases. In some examples, the vehicle control circuitry 102 selects, for the threshold frequency, the frequency value corresponding to an example intersection 312 between the first line 306 and the second line 308.

Figure 4:
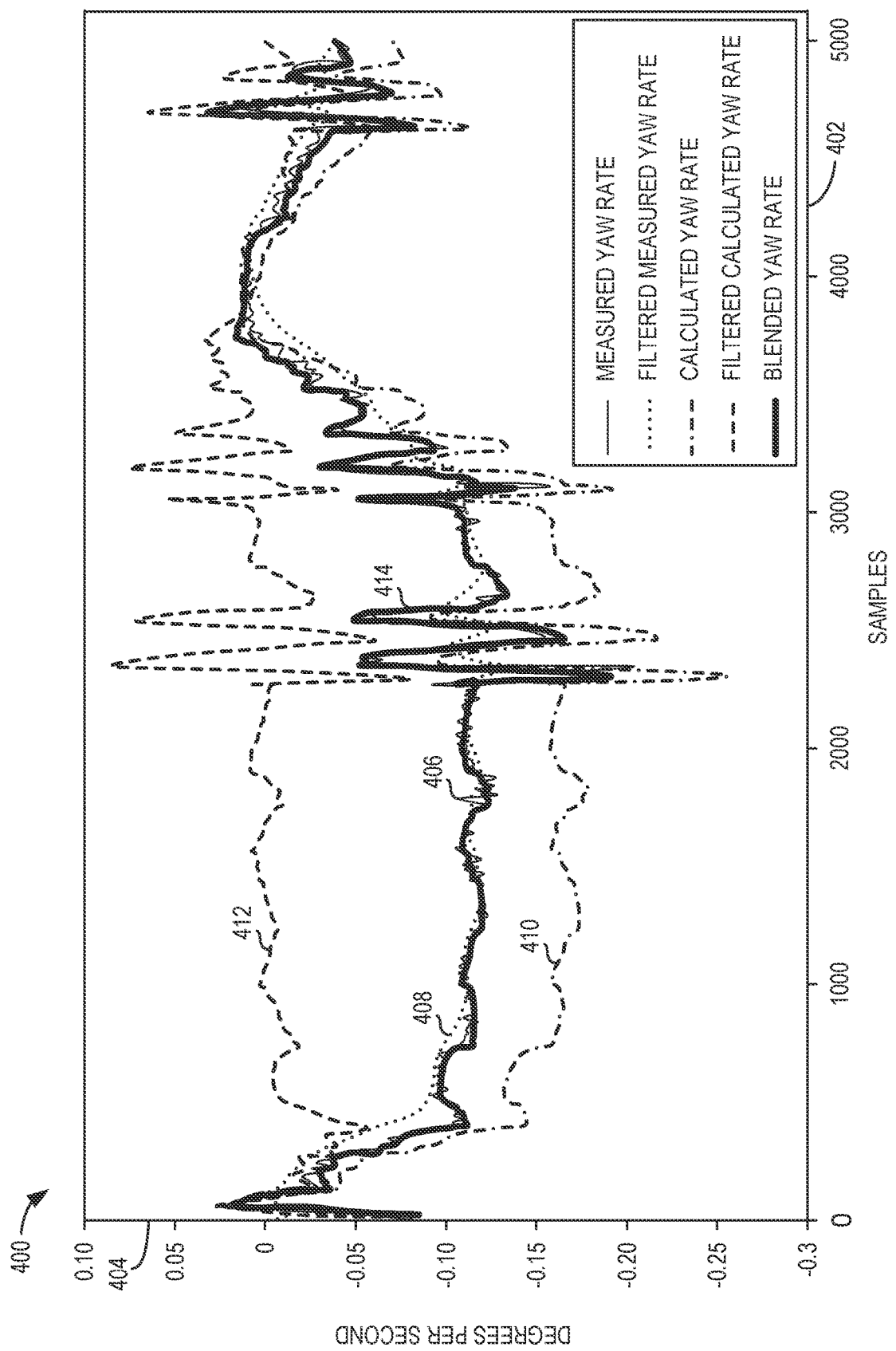
FIG. 4 is an example plot of example yaw rate signals measured and/or obtained by the example vehicle control circuitry of FIGS. 1 and/or 2.

FIG. 4 is an example plot 400 of example yaw rate signals measured and/or obtained by the example vehicle control circuitry 102 of FIGS. 1 and/or 2. In the illustrated example of FIG. 4, the plot 400 includes a first example axis (e.g., a horizontal axis) 402 representing a number of samples (e.g., data samples), and a second example axis (e.g., a vertical axis) 404 representing example yaw rate values (e.g., in degrees per second). In this example, the plot 400 includes a first example signal 406 representing an example measured yaw rate from the yaw rate sensor 106 of FIG. 1, a second example signal 408 representing example filtered values of the measured yaw rate, a third example signal 410 representing an example calculated yaw rate based on sensor data from the steering wheel sensor 104 of FIG. 1, a fourth example signal 412 representing example filtered values of the calculated yaw rate, and a fifth example signal 414 representing example blended yaw rates based on the filtered measured yaw rates and the filtered calculated yaw rates.

In the illustrated example of FIG. 4, the first signal 406 includes high-frequency fluctuations and/or variations resulting from transmission delays and/or noise introduced during measurement by the yaw rate sensor 106. In some examples, to reduce the noise and/or fluctuations in the first signal 406, the vehicle control circuitry 102 filters the first signal 406 (e.g., using a low pass filter) and, as a result, generates and/or outputs the second signal 408. In this example, the third signal 410 includes an offset (e.g., a scaling difference) relative to the first and second signals 406, 408, where the offset in the third signal 410 results from an example offset associated with the steering system of the vehicle 100. In some examples, the vehicle control circuitry 102 filters the third signal 410 (e.g., using a high pass filter) to reduce the offset and, as a result, generate the fourth signal 412.

In the example of FIG. 4, the vehicle control circuitry 102 blends (e.g., combines, adds together) the second signal 408 and the fourth signal 412. As a result of the blending, the vehicle control circuitry 102 generates and/or outputs the fifth signal 414 that is similar to the measured yaw rates represented in the first signal 406, but is smoother (e.g., includes less noise and/or fluctuations) compared to the first signal 406. By controlling the motor(s) 108 of FIG. 1 based on the blended fifth signal 414, the vehicle control circuitry 102 can reduce oscillation in the control signal(s) 118 (e.g., in the event of an external disturbance such as frost heave) and, thus, may reduce power demands of the motor(s) 108 and/or may result in a smoother riding experience for a driver and/or passenger of the vehicle 100.

In some examples, the vehicle control circuitry 102 includes means for interfacing. For example, the means for interfacing may be implemented by the input interface circuitry 202. In some examples, the input interface circuitry 202 may be instantiated by programmable circuitry such as the example programmable circuitry 612 of FIG. 6. For instance, the input interface circuitry 202 may be instantiated by the example microprocessor 700 of FIG. 7 executing machine executable instructions such as those implemented by at least blocks 502, 518 of FIG. 5. In some examples, the input interface circuitry 202 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the input interface circuitry 202 may be instantiated by any other combination of hardware, software, and/or firmware. For example, the input interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the vehicle control circuitry 102 includes means for calculating. For example, the means for calculating may be implemented by the yaw rate calculation circuitry 204. In some examples, the yaw rate calculation circuitry 204 may be instantiated by programmable circuitry such as the example programmable circuitry 612 of FIG. 6. For instance, the yaw rate calculation circuitry 204 may be instantiated by the example microprocessor 700 of FIG. 7 executing machine executable instructions such as those implemented by at least blocks 504, 506 of FIG. 5. In some examples, the yaw rate calculation circuitry 204 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the yaw rate calculation circuitry 204 may be instantiated by any other combination of hardware, software, and/or firmware. For example, the yaw rate calculation circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the vehicle control circuitry 102 includes means for selecting. For example, the means for selecting may be implemented by the frequency selection circuitry 206. In some examples, the frequency selection circuitry 206 may be instantiated by programmable circuitry such as the example programmable circuitry 612 of FIG. 6. For instance, the frequency selection circuitry 206 may be instantiated by the example microprocessor 700 of FIG. 7 executing machine executable instructions such as those implemented by at least block 508 of FIG. 5. In some examples, the frequency selection circuitry 206 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the frequency selection circuitry 206 may be instantiated by any other combination of hardware, software, and/or firmware. For example, the frequency selection circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the vehicle control circuitry 102 includes means for filtering. For example, the means for filtering may be implemented by the signal filtering circuitry 208. In some examples, the signal filtering circuitry 208 may be instantiated by programmable circuitry such as the example programmable circuitry 612 of FIG. 6. For instance, the signal filtering circuitry 208 may be instantiated by the example microprocessor 700 of FIG. 7 executing machine executable instructions such as those implemented by at least blocks 510, 512 of FIG. 5. In some examples, the signal filtering circuitry 208 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the signal filtering circuitry 208 may be instantiated by any other combination of hardware, software, and/or firmware. For example, the signal filtering circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the vehicle control circuitry 102 includes means for controlling. For example, the means for controlling may be implemented by the torque control circuitry 210. In some examples, the torque control circuitry 210 may be instantiated by programmable circuitry such as the example programmable circuitry 612 of FIG. 6. For instance, the torque control circuitry 210 may be instantiated by the example microprocessor 700 of FIG. 7 executing machine executable instructions such as those implemented by at least block 516 of FIG. 5. In some examples, the torque control circuitry 210 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the torque control circuitry 210 may be instantiated by any other combination of hardware, software, and/or firmware. For example, the torque control circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the vehicle control circuitry 102 includes means for blending. For example, the means for blending may be implemented by the signal blending circuitry 212. In some examples, the signal blending circuitry 212 may be instantiated by programmable circuitry such as the example programmable circuitry 612 of FIG. 6. For instance, the signal blending circuitry 212 may be instantiated by the example microprocessor 700 of FIG. 7 executing machine executable instructions such as those implemented by at least block 514 of FIG. 5. In some examples, the signal blending circuitry 212 may be instantiated by hardware logic circuitry, which may be implemented by an ASIC, XPU, or the FPGA circuitry 800 of FIG. 8 configured and/or structured to perform operations corresponding to the machine readable instructions. Additionally or alternatively, the signal blending circuitry 212 may be instantiated by any other combination of hardware, software, and/or firmware. For example, the signal blending circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

While an example manner of implementing the vehicle control circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example input interface circuitry 202, the example yaw rate calculation circuitry 204, the example frequency selection circuitry 206, the example signal filtering circuitry 208, the example torque control circuitry 210, the example signal blending circuitry 212, the example database 214, and/or, more generally, the example vehicle control circuitry 102 of FIG. 2, may be implemented by hardware alone or by hardware in combination with software and/or firmware. Thus, for example, any of the example input interface circuitry 202, the example yaw rate calculation circuitry 204, the example frequency selection circuitry 206, the example signal filtering circuitry 208, the example torque control circuitry 210, the example signal blending circuitry 212, the example database 214, and/or, more generally, the example vehicle control circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example vehicle control circuitry 102 of FIG. 2 may include one or more elements, processes, and/or devices in addition to, or instead of, those illustrated in FIG. 2, and/or may include more than one of any or all of the illustrated elements, processes and devices.

Figure 5:
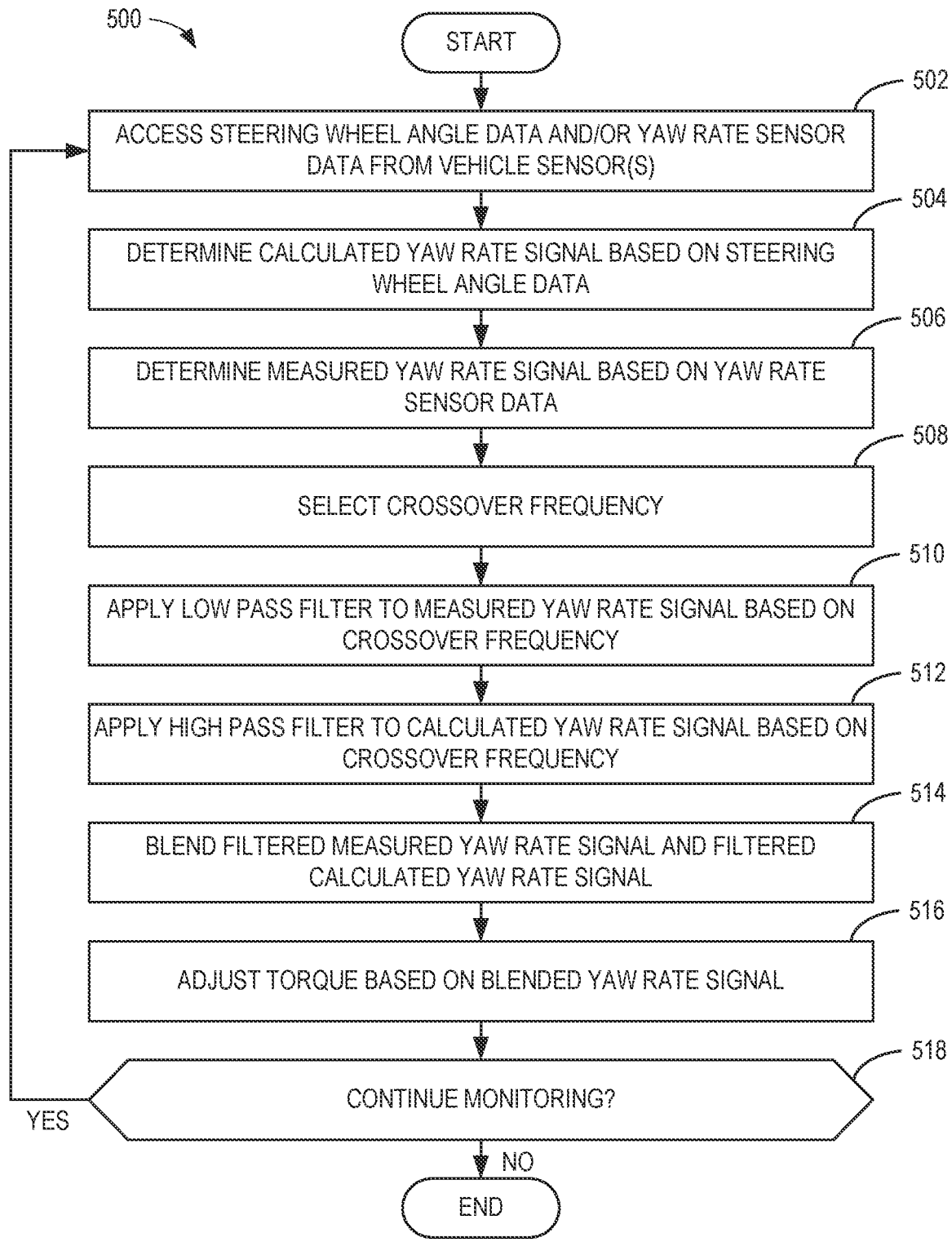
FIG. 5 is a flowchart representative of example machine readable instructions and/or example operations that may be executed, instantiated, and/or performed by example programmable circuitry to implement the vehicle control circuitry 102 of FIG. 2.

A flowchart representative of example machine readable instructions, which may be executed by programmable circuitry to implement and/or instantiate the vehicle control circuitry 102 of FIG. 2 and/or representative of example operations which may be performed by programmable circuitry to implement and/or instantiate the vehicle control circuitry 102 of FIG. 2, is shown in FIG. 5. The machine readable instructions may be one or more executable programs or portion(s) of one or more executable programs for execution by programmable circuitry such as the programmable circuitry 612 shown in the example processor platform 600 discussed below in connection with FIG. 6 and/or may be one or more function(s) or portion(s) of functions to be performed by the example programmable circuitry (e.g., an FPGA) discussed below in connection with FIGS. 7 and/or 8. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart illustrated in FIG. 5, many other methods of implementing the example vehicle control circuitry 102 may alternatively be used. For example, the order of execution of the blocks of the flowchart may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

FIG. 5 is a flowchart representative of example machine readable instructions and/or example operations 500 that may be executed, instantiated, and/or performed by programmable circuitry to implement the example vehicle control circuitry 102 of FIGS. 1 and/or 2. The example machine-readable instructions and/or the example operations 500 of FIG. 5 begin at block 502, at which the example vehicle control circuitry 102 accesses and/or obtains the example steering wheel angle data 112 and/or the example yaw rate sensor data 114 from one or more example vehicle sensors of the vehicle 100 of FIG. 1. For example, the example input interface circuitry 202 of FIG. 2 accesses the steering wheel angle data 112 output by the example steering wheel sensor 104 of FIG. 1, and accesses the yaw rate sensor data 114 from the example yaw rate sensor 106 of FIG. 1.

At block 504, the example vehicle control circuitry 102 determines an example calculated yaw rate signal based on the steering wheel angle data 112. For example, the example yaw rate calculation circuitry 204 of FIG. 2 determines the calculated yaw rate signal based on steering wheel angle values from the steering wheel angle data 112 and/or based on one or more example vehicle parameters of the vehicle 100. For example, the vehicle parameters can include a wheelbase of the vehicle 100, a travel speed of the vehicle 100, a mass of the vehicle 100, measurements of vehicle parts of the vehicle 100, distances between relative areas of the vehicle 100, etc.

At block 506, the example vehicle control circuitry 102 determines an example measured yaw rate signal based on the yaw rate sensor data 114. For example, the yaw rate calculation circuitry 204 determines that the measured yaw rate signal corresponds to measured yaw rate values over time represented in the yaw rate sensor data 114.

At block 508, the example vehicle control circuitry 102 selects an example crossover frequency (e.g., a threshold frequency). For example, the example frequency selection circuitry 206 of FIG. 2 selects the crossover frequency based on threshold yaw rate (e.g., a maximum yaw rate) expected along a projected path of the vehicle 100, where the expected threshold yaw rate can be based on a road curvature along the projected path and/or based on a threshold speed (e.g., a posted speed limit) along the projected path. In some examples, the frequency selection circuitry 206 selects the crossover frequency based on historical testing and/or validation results associated with one or more other vehicles.

At block 510, the example vehicle control circuitry 102 applies an example low pass filter to the measured yaw rate signal based on the crossover frequency. For example, the example signal filtering circuitry 208 of FIG. 2 applies the low pass filter to the measured yaw rate signal to pass low-frequency signal components (e.g., signal components that are below the crossover frequency) and attenuate high-frequency signal components (e.g., signal components that are at or above the crossover frequency) in the measured yaw rate signal. In some examples, as a result of applying the low pass filter, the signal filtering circuitry 208 outputs an example filtered measured yaw rate signal.

At block 512, the example vehicle control circuitry 102 applies an example high pass filter to the calculated yaw rate signal based on the crossover frequency. For example, the signal filtering circuitry 208 applies the high pass filter to the calculated yaw rate signal to attenuate the low-frequency signal components (e.g., signal components that are below the crossover frequency) and pass the high-frequency signal components (e.g., signal components that are at or above the crossover frequency) in the calculated yaw rate signal. In some examples, as a result of applying the high pass filter, the signal filtering circuitry 208 outputs an example filtered calculated yaw rate signal.

At block 514, the example vehicle control circuitry 102 blends the filtered measured yaw rate signal and the filtered calculated yaw rate signal. For example, the example signal blending circuitry 212 of FIG. 2 blends (e.g., combines, adds together) the filtered measured yaw rate signal and the calculated yaw rate signal to output an example blended yaw rate signal.

At block 516, the example vehicle control circuitry 102 adjusts an example torque based on the blended yaw rate signal. For example, the example torque control circuitry 210 of FIG. 2 provides the blended yaw rate signal as input to a closed loop controller, and generates the example control signal(s) 118 based on an output of the closed loop controller. In some examples, the torque control circuitry 210 provides and/or transmits the control signal(s) 118 to respective one(s) of the example motor(s) 108 of FIG. 1 to adjust a direction and/or a magnitude of the torque applied by the motor(s) 108.

At block 518, the example vehicle control circuitry 102 determines whether to continue monitoring. For example, the input interface circuitry 202 determines to continue monitoring when the vehicle 100 is operating and/or when new steering wheel angle data and/or new yaw rate sensor data is obtained. In response to the input interface circuitry 202 determining to continue monitoring (e.g., block 518 returns a result of YES), control returns to block 502. Alternatively, in response to the input interface circuitry 202 determining not to continue monitoring (e.g., block 518 returns a result of NO), control ends.

Figure 6:
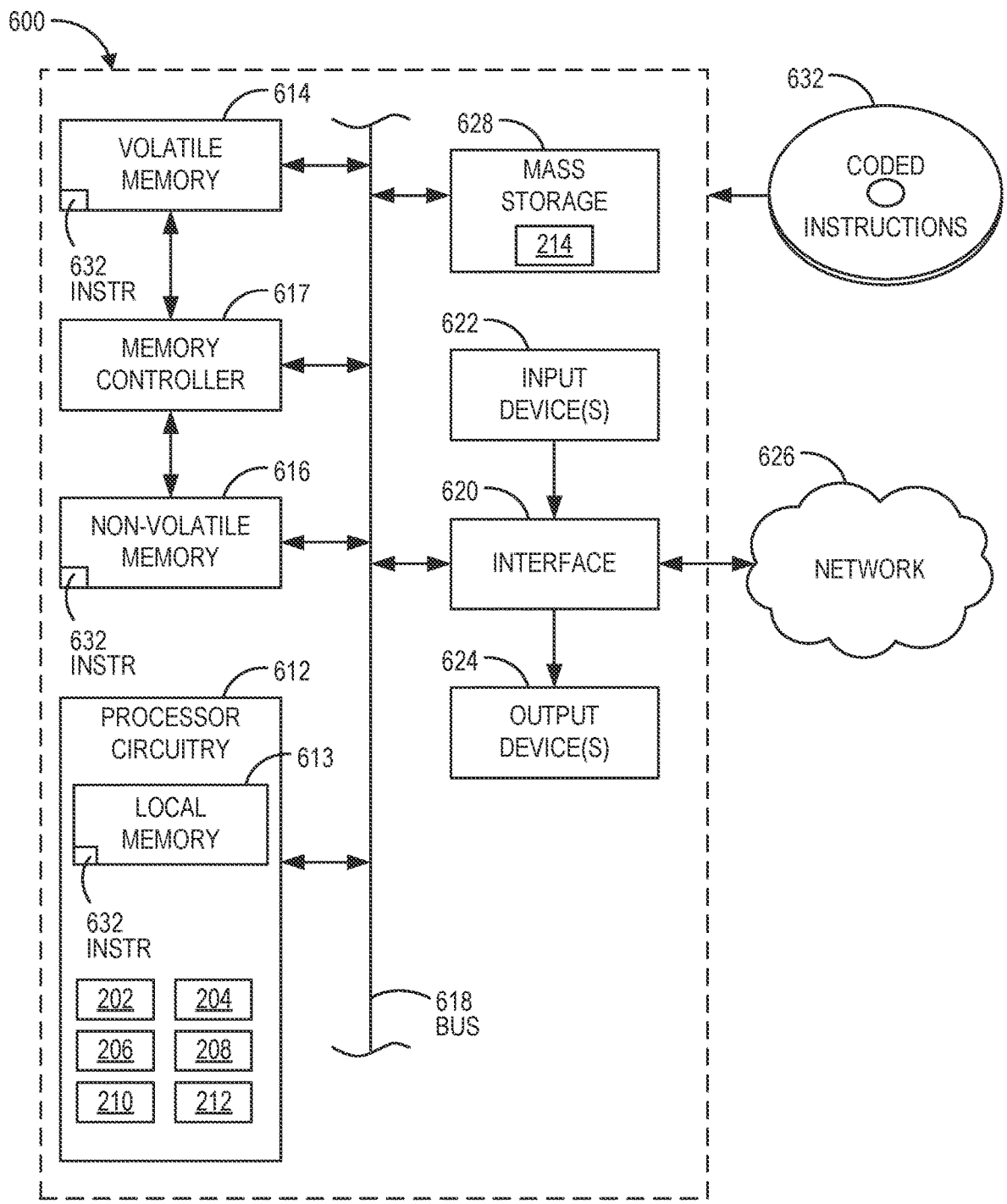
FIG. 6 is a block diagram of an example processing platform including programmable circuitry structured to execute, instantiate, and/or perform the example machine readable instructions and/or perform the example operations of FIG. 5 to implement the vehicle control circuitry 102 of FIG. 2.

FIG. 6 is a block diagram of an example programmable circuitry platform 600 structured to execute and/or instantiate the example machine-readable instructions and/or the example operations of FIG. 5 to implement the vehicle control circuitry 102 of FIG. 2. The programmable circuitry platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 600 of the illustrated example includes programmable circuitry 612. The programmable circuitry 612 of the illustrated example is hardware. For example, the programmable circuitry 612 can be implemented by one or more integrated circuits, logic circuits, FPGAs, microprocessors, CPUs, GPUs, DSPs, and/or microcontrollers from any desired family or manufacturer. The programmable circuitry 612 may be implemented by one or more semiconductor based (e.g., silicon based) devices. In this example, the programmable circuitry 612 implements the example input interface circuitry 202, the example yaw rate calculation circuitry 204, the example frequency selection circuitry 206, the example signal filtering circuitry 208, the example torque control circuitry 210, the example signal blending circuitry 212, and the example database 214.

The programmable circuitry 612 of the illustrated example includes a local memory 613 (e.g., a cache, registers, etc.). The programmable circuitry 612 of the illustrated example is in communication with main memory 614, 616, which includes a volatile memory 614 and a non-volatile memory 616, by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617. In some examples, the memory controller 617 may be implemented by one or more integrated circuits, logic circuits, microcontrollers from any desired family or manufacturer, or any other type of circuitry to manage the flow of data going to and from the main memory 614, 616.

The programmable circuitry platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user (e.g., a human user, a machine user, etc.) to enter data and/or commands into the programmable circuitry 612. The input device(s) 622 can be implemented by, for example, an audio sensor, a microphone, a camera (still or video), a keyboard, a button, a mouse, a touchscreen, a trackpad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 600 of the illustrated example also includes one or more mass storage discs or devices 628 to store firmware, software, and/or data. Examples of such mass storage discs or devices 628 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 632, which may be implemented by the machine readable instructions of FIG. 5, may be stored in the mass storage device 628, in the volatile memory 614, in the non-volatile memory 616, and/or on at least one non-transitory computer readable storage medium such as a CD or DVD which may be removable.

Figure 7:
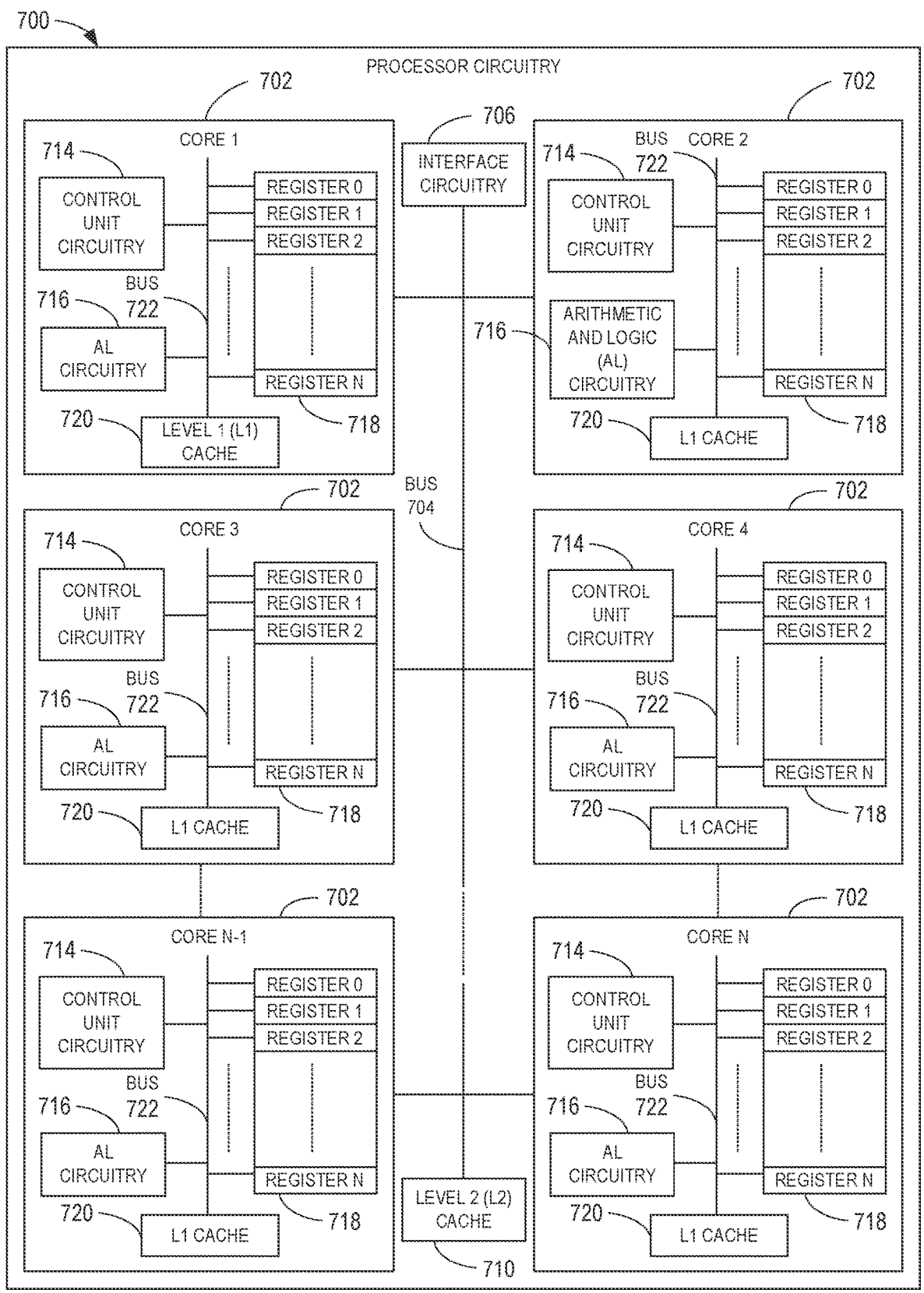
FIG. 7 is a block diagram of an example implementation of the programmable circuitry of FIG. 6.

FIG. 7 is a block diagram of an example implementation of the programmable circuitry 612 of FIG. 6. In this example, the programmable circuitry 612 of FIG. 6 is implemented by a microprocessor 700. For example, the microprocessor 700 may be a general-purpose microprocessor (e.g., general-purpose microprocessor circuitry). The microprocessor 700 executes some or all of the machine-readable instructions of the flowcharts of FIG. 5 to effectively instantiate the circuitry of FIG. 2 as logic circuits to perform operations corresponding to those machine readable instructions. In some such examples, the circuitry of FIG. 2 is instantiated by the hardware circuits of the microprocessor 700 in combination with the machine-readable instructions. For example, the microprocessor 700 may be implemented by multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIG. 5.

The cores 702 may communicate by a first example bus 704. In some examples, the first bus 704 may be implemented by a communication bus to effectuate communication associated with one(s) of the cores 702. For example, the first bus 704 may be implemented by at least one of an Inter-Integrated Circuit (I2C) bus, a Serial Peripheral Interface (SPI) bus, a PCI bus, or a PCIe bus. Additionally or alternatively, the first bus 704 may be implemented by any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2 cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the local memory 720, and a second example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating-point operations. In yet other examples, the AL circuitry 716 may include first AL circuitry that performs integer-based operations and second AL circuitry that performs floating-point operations. In some examples, the AL circuitry 716 may be referred to as an Arithmetic Logic Unit (ALU).

The registers 718 are semiconductor-based structures to store data and/or instructions such as results of one or more of the operations performed by the AL circuitry 716 of the corresponding core 702. For example, the registers 718 may include vector register(s), SIMD register(s), general-purpose register(s), flag register(s), segment register(s), machine-specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure, such as by being distributed throughout the core 702 to shorten access time. The second bus 722 may be implemented by at least one of an I2C bus, a SPI bus, a PCI bus, or a PCIe bus.

Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages.

The microprocessor 700 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 700, in the same chip package as the microprocessor 700 and/or in one or more separate packages from the microprocessor 700.

Figure 8:
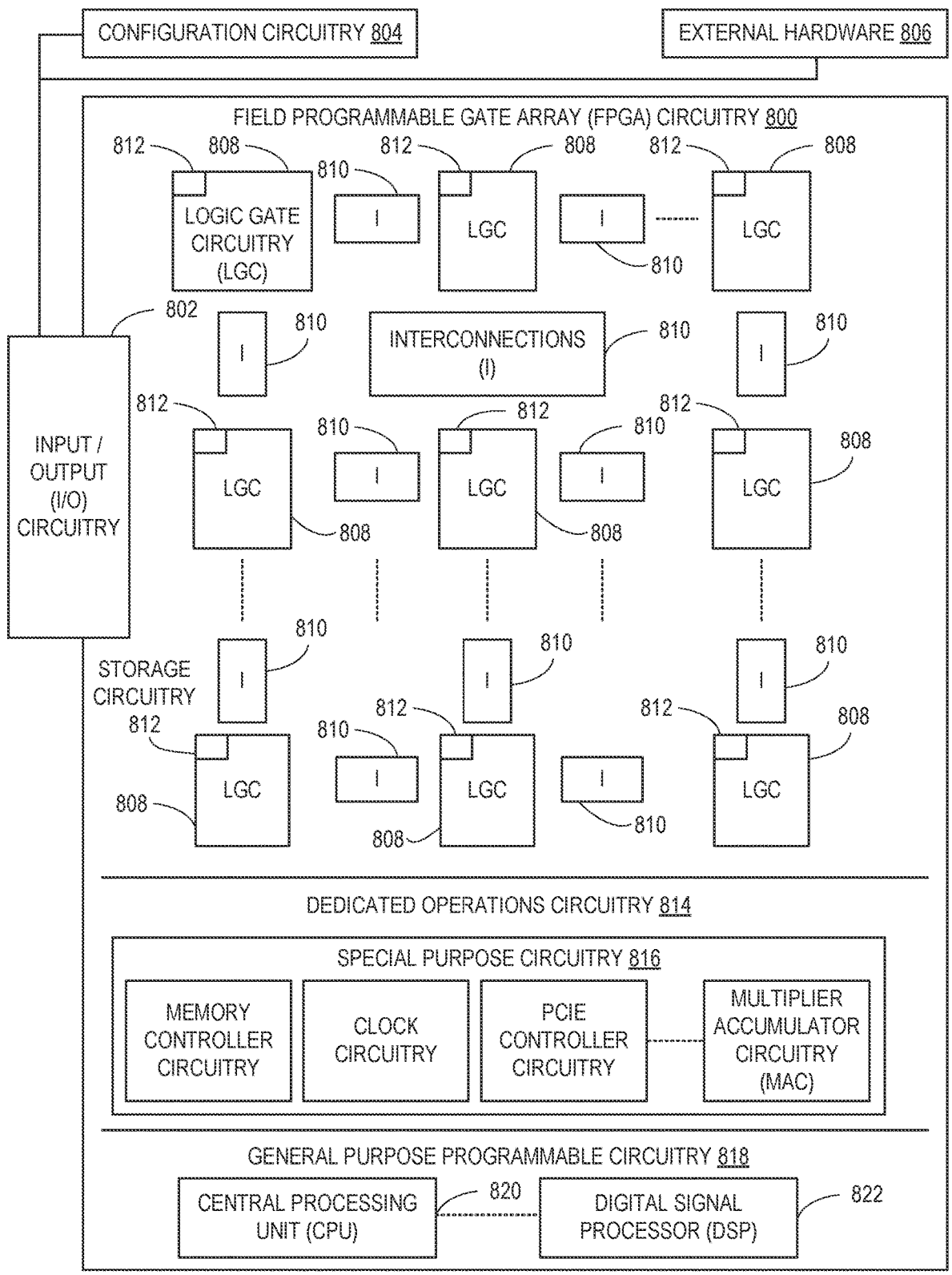
FIG. 8 is a block diagram of another example implementation of the programmable circuitry of FIG. 6.

FIG. 8 is a block diagram of another example implementation of the programmable circuitry 612 of FIG. 6. In this example, the programmable circuitry 612 is implemented by FPGA circuitry 800. For example, the FPGA circuitry 800 may be implemented by an FPGA. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 5 but whose interconnections and logic circuitry are fixed once fabricated), the FPGA circuitry 800 of the example of FIG. 8 includes interconnections and logic circuitry that may be configured, structured, programmed, and/or interconnected in different ways after fabrication to instantiate, for example, some or all of the operations/functions corresponding to the machine readable instructions represented by the flowchart of FIG. 5. In particular, the FPGA circuitry 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the instructions (e.g., the software and/or firmware) represented by the flowchart of FIG. 5. As such, the FPGA circuitry 800 may be configured and/or structured to effectively instantiate some or all of the operations/functions corresponding to the machine readable instructions of the flowchart of FIG. 5 as dedicated logic circuits to perform the operations/functions corresponding to those software instructions in a dedicated manner analogous to an ASIC. Therefore, the FPGA circuitry 800 may perform the operations/functions corresponding to the some or all of the machine readable instructions of FIG. 5 faster than the general-purpose microprocessor can execute the same.

In the example of FIG. 8, the FPGA circuitry 800 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 800 of FIG. 8 may access and/or load the binary file to cause the FPGA circuitry 800 of FIG. 8 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 800 of FIG. 8 to cause configuration and/or structuring of the FPGA circuitry 800 of FIG. 8, or portion(s) thereof.

The FPGA circuitry 800 of FIG. 8, includes example input/output (I/O) circuitry 802 to obtain and/or output data to/from example configuration circuitry 804 and/or external hardware 806. For example, the configuration circuitry 804 may be implemented by interface circuitry that may obtain a binary file, which may be implemented by a bit stream, data, and/or machine-readable instructions, to configure the FPGA circuitry 800, or portion(s) thereof. In some such examples, the configuration circuitry 804 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 806 may be implemented by external hardware circuitry. For example, the external hardware 806 may be implemented by the microprocessor 700 of FIG. 7.

The FPGA circuitry 800 also includes an array of example logic gate circuitry 808, a plurality of example configurable interconnections 810, and example storage circuitry 812. The logic gate circuitry 808 and the configurable interconnections 810 are configurable to instantiate one or more operations/functions that may correspond to at least some of the machine readable instructions of FIG. 5 and/or other desired operations. The logic gate circuitry 808 shown in FIG. 8 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations/functions. The logic gate circuitry 808 may include other electrical structures such as look-up tables (LUTs), registers (e.g., flip-flops or latches), multiplexers, etc.

The configurable interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example dedicated operations circuitry 814. In this example, the dedicated operations circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the programmable circuitry 612 of FIG. 6, many other approaches are contemplated. For example, FPGA circuitry may include an on-board CPU, such as one or more of the example CPU 820 of FIG. 7. Therefore, the programmable circuitry 612 of FIG. 6 may additionally be implemented by combining at least the example microprocessor 700 of FIG. 7 and the example FPGA circuitry 800 of FIG. 8. In some such hybrid examples, one or more cores 702 of FIG. 7 may execute a first portion of the machine readable instructions represented by the flowchart of FIG. 5 to perform first operation(s)/function(s), the FPGA circuitry 800 of FIG. 8 may be configured and/or structured to perform second operation(s)/function(s) corresponding to a second portion of the machine readable instructions represented by the flowcharts of FIG. 5, and/or an ASIC may be configured and/or structured to perform third operation(s)/function(s) corresponding to a third portion of the machine readable instructions represented by the flowcharts of FIG. 5.

It should be understood that some or all of the circuitry of FIG. 2 may, thus, be instantiated at the same or different times. For example, same and/or different portion(s) of the microprocessor 700 of FIG. 7 may be programmed to execute portion(s) of machine-readable instructions at the same and/or different times. In some examples, same and/or different portion(s) of the FPGA circuitry 800 of FIG. 8 may be configured and/or structured to perform operations/functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 700 of FIG. 7 may execute machine readable instructions in one or more threads executing concurrently and/or in series. In some examples, the FPGA circuitry 800 of FIG. 8 may be configured and/or structured to carry out operations/functions concurrently and/or in series. Moreover, in some examples, some or all of the circuitry of FIG. 2 may be implemented within one or more virtual machines and/or containers executing on the microprocessor 700 of FIG. 7.

In some examples, the programmable circuitry 612 of FIG. 6 may be in one or more packages. For example, the microprocessor 700 of FIG. 7 and/or the FPGA circuitry 800 of FIG. 8 may be in one or more packages. In some examples, an XPU may be implemented by the programmable circuitry 612 of FIG. 6, which may be in one or more packages. For example, the XPU may include a CPU (e.g., the microprocessor 700 of FIG. 7, the CPU 820 of FIG. 8, etc.) in one package, a DSP (e.g., the DSP 822 of FIG. 8) in another package, a GPU in yet another package, and an FPGA (e.g., the FPGA circuitry 800 of FIG. 8) in still yet another package.

Figure 9:
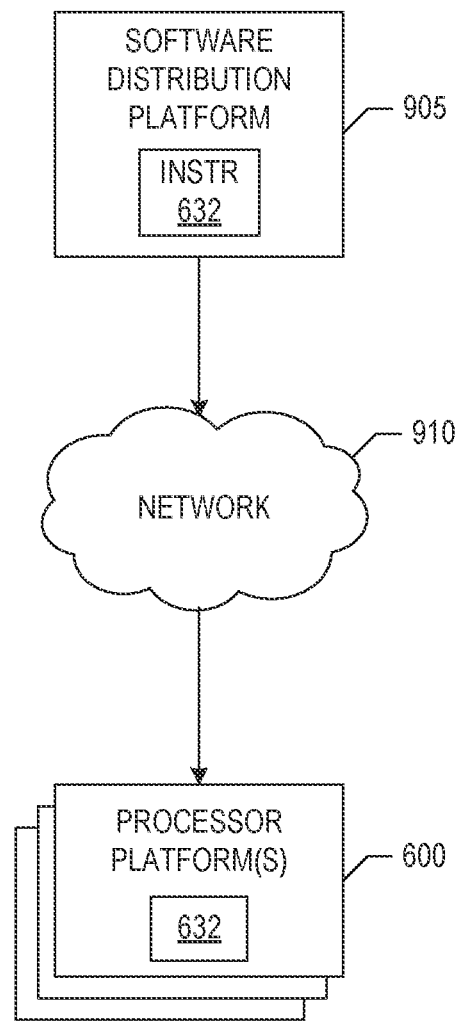
FIG. 9 is a block diagram of an example software/firmware/instructions distribution platform (e.g., one or more servers) to distribute software, instructions, and/or firmware (e.g., corresponding to the example machine readable instructions of FIG. 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to other hardware devices (e.g., hardware devices owned and/or operated by third parties from the owner and/or operator of the software distribution platform) is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions of FIG. 5, as described above. The one or more servers of the example software distribution platform 905 are in communication with an example network 910, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions of FIG. 5, may be downloaded to the example programmable circuitry platform 600, which is to execute the machine readable instructions 632 to implement the vehicle control circuitry 102. In some examples, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that perform frequency-based blending of example yaw rate signals to control one or more operations (e.g., steering) of a vehicle. Examples disclosed herein blend high-frequency signal components of a measured yaw rate signal from an example yaw rate sensor and low-frequency signal components of a calculated yaw rate signal (e.g., an estimated yaw rate signal) from an example steering wheel angle sensor to generate and/or output an example blended yaw rate signal. Further, examples disclosed herein provided the blended yaw rate signal as feedback to an example closed-loop controller, where the closed-loop controller outputs one or more example control signals based on the blended yaw rate signal. In some examples, by controlling one or more vehicle motors based on the control signal(s), examples disclosed herein may reduce excessive oscillation in steering of the vehicle, thus improving comfort and/or providing a smoother ride for passengers of the vehicle. Further, disclosed systems, apparatus, articles of manufacture, and methods may reduce unnecessary activation and/or adjustment of example control devices (e.g., motors, actuators, etc.) of the vehicle, thereby reducing power utilized by one(s) of the control devices. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to control a vehicle based on signal blending are disclosed herein. Further examples and combinations thereof include the following:

Example 1 includes an apparatus comprising memory, instructions, and programmable circuitry to be programmed by the instructions to at least determine a first yaw rate signal based on first signal data output by a yaw rate sensor of a vehicle, determine a second yaw rate signal based on second signal data output by a steering wheel angle sensor of the vehicle, determine a blended yaw rate signal based on the first yaw rate signal and the second yaw rate signal, and adjust a torque to be applied by a motor of the vehicle based on the blended yaw rate signal.

Example 2 includes the apparatus of example 1, wherein the programmable circuitry is to filter the first yaw rate signal and the second yaw rate signal based on a crossover frequency.

Example 3 includes the apparatus of example 2, wherein the programmable circuitry is to apply a low pass filter to the first yaw rate signal and apply a high pass filter to the second yaw rate signal, the low pass filter and the high pass filter corresponding to the crossover frequency.

Example 4 includes the apparatus of example 3, wherein the programmable circuitry is to select the crossover frequency based on at least one of (a) a road curvature along a projected path of the vehicle or (b) a threshold speed of the vehicle along the projected path.

Example 5 includes the apparatus of example 3, wherein the programmable circuitry is to determine the blended yaw rate signal by combining the filtered first yaw rate signal and the filtered second yaw rate signal.

Example 6 includes the apparatus of example 2, wherein the programmable circuitry is to apply a first filter to the first yaw rate signal and apply a second filter to the second yaw rate signal, the first filter to attenuate first signal components of the first yaw rate signal that are above the crossover frequency, the second filter to attenuate second signal components of the second yaw rate signal that are below the crossover frequency.

Example 7 includes the apparatus of example 6, wherein the first filter and the second filter include at least one of a high pass filter, a low pass filter, a notch filter, or a bandpass filter.

Example 8 includes the apparatus of example 1, wherein the first yaw rate signal corresponds to the first signal data, the programmable circuitry to estimate the second yaw rate signal based on the second signal data and one or more vehicle parameters.

Example 9 includes the apparatus of example 1, wherein the programmable circuitry is to select the adjusted torque by providing the blended yaw rate signal as feedback to a closed loop controller.

Example 10 includes a non-transitory computer readable medium comprising instructions that, when executed, cause programmable circuitry to at least determine a first yaw rate signal based on first signal data output by a yaw rate sensor of a vehicle, determine a second yaw rate signal based on second signal data output by a steering wheel angle sensor of the vehicle, determine a blended yaw rate signal based on the first yaw rate signal and the second yaw rate signal, and adjust a torque to be applied by a motor of the vehicle based on the blended yaw rate signal.

Example 11 includes the non-transitory computer readable medium of example 10, wherein the instructions cause the programmable circuitry to filter the first yaw rate signal and the second yaw rate signal based on a crossover frequency.

Example 12 includes the non-transitory computer readable medium of example 11, wherein the instructions cause the programmable circuitry to apply a low pass filter to the first yaw rate signal and apply a high pass filter to the second yaw rate signal, the low pass filter and the high pass filter corresponding to the crossover frequency.

Example 13 includes the non-transitory computer readable medium of example 12, wherein the instructions cause the programmable circuitry to select the crossover frequency based on at least one of (a) a road curvature along a projected path of the vehicle or (b) a threshold speed of the vehicle along the projected path.

Example 14 includes the non-transitory computer readable medium of example 12, wherein the instructions cause the programmable circuitry to determine the blended yaw rate signal by combining the filtered first yaw rate signal and the filtered second yaw rate signal.

Example 15 includes the non-transitory computer readable medium of example 10, wherein the first yaw rate signal corresponds to the first signal data, and the instructions cause the programmable circuitry to estimate the second yaw rate signal based on the second signal data and one or more vehicle parameters.

Example 16 includes the non-transitory computer readable medium of example 10, wherein the instructions cause the programmable circuitry to select the adjusted torque by providing the blended yaw rate signal as feedback to a closed loop controller.

Example 17 includes a method comprising determining a first yaw rate signal based on first signal data output by a yaw rate sensor of a vehicle, determining a second yaw rate signal based on second signal data output by a steering wheel angle sensor of the vehicle, determining a blended yaw rate signal based on the first yaw rate signal and the second yaw rate signal, and adjusting a torque to be applied by a motor of the vehicle based on the blended yaw rate signal.

Example 18 includes the method of example 17, further including filtering the first yaw rate signal and the second yaw rate signal based on a crossover frequency.

Example 19 includes the method of example 18, further including applying a low pass filter to the first yaw rate signal and applying a high pass filter to the second yaw rate signal, the low pass filter and the high pass filter corresponding to the crossover frequency.

Example 20 includes the method of example 19, further including determining the blended yaw rate signal by combining the filtered first yaw rate signal and the filtered second yaw rate signal.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
    memory;
    instructions; and
    programmable circuitry to be programmed by the instructions to at least:
        determine a first yaw rate signal based on first signal data output by a yaw rate sensor of a vehicle;
        determine a second yaw rate signal based on second signal data output by a steering wheel angle sensor of the vehicle;
        determine a blended yaw rate signal based on the first yaw rate signal and the second yaw rate signal; and
        adjust a torque to be applied by a motor of the vehicle based on the blended yaw rate signal.

2. The apparatus of claim 1, wherein the programmable circuitry is to filter the first yaw rate signal and the second yaw rate signal based on a crossover frequency.

3. The apparatus of claim 2, wherein the programmable circuitry is to apply a low pass filter to the first yaw rate signal and apply a high pass filter to the second yaw rate signal, the low pass filter and the high pass filter corresponding to the crossover frequency.

4. The apparatus of claim 3, wherein the programmable circuitry is to select the crossover frequency based on at least one of (a) a road curvature along a projected path of the vehicle or (b) a threshold speed of the vehicle along the projected path.

5. The apparatus of claim 3, wherein the programmable circuitry is to determine the blended yaw rate signal by combining the filtered first yaw rate signal and the filtered second yaw rate signal.

6. The apparatus of claim 2, wherein the programmable circuitry is to apply a first filter to the first yaw rate signal and apply a second filter to the second yaw rate signal, the first filter to attenuate first signal components of the first yaw rate signal that are above the crossover frequency, the second filter to attenuate second signal components of the second yaw rate signal that are below the crossover frequency.

7. The apparatus of claim 6, wherein the first filter and the second filter include at least one of a high pass filter, a low pass filter, a notch filter, or a bandpass filter.

8. The apparatus of claim 1, wherein the first yaw rate signal corresponds to the first signal data, the programmable circuitry to estimate the second yaw rate signal based on the second signal data and one or more vehicle parameters.

9. The apparatus of claim 1, wherein the programmable circuitry is to select the adjusted torque by providing the blended yaw rate signal as feedback to a closed loop controller.

10. A non-transitory computer readable medium comprising instructions that, when executed, cause programmable circuitry to at least:
    determine a first yaw rate signal based on first signal data output by a yaw rate sensor of a vehicle;
    determine a second yaw rate signal based on second signal data output by a steering wheel angle sensor of the vehicle;
    determine a blended yaw rate signal based on the first yaw rate signal and the second yaw rate signal; and
    adjust a torque to be applied by a motor of the vehicle based on the blended yaw rate signal.

11. The non-transitory computer readable medium of claim 10, wherein the instructions cause the programmable circuitry to filter the first yaw rate signal and the second yaw rate signal based on a crossover frequency.

12. The non-transitory computer readable medium of claim 11, wherein the instructions cause the programmable circuitry to apply a low pass filter to the first yaw rate signal and apply a high pass filter to the second yaw rate signal, the low pass filter and the high pass filter corresponding to the crossover frequency.

13. The non-transitory computer readable medium of claim 12, wherein the instructions cause the programmable circuitry to select the crossover frequency based on at least one of (a) a road curvature along a projected path of the vehicle or (b) a threshold speed of the vehicle along the projected path.

14. The non-transitory computer readable medium of claim 12, wherein the instructions cause the programmable circuitry to determine the blended yaw rate signal by combining the filtered first yaw rate signal and the filtered second yaw rate signal.

15. The non-transitory computer readable medium of claim 10, wherein the first yaw rate signal corresponds to the first signal data, and the instructions cause the programmable circuitry to estimate the second yaw rate signal based on the second signal data and one or more vehicle parameters.

16. The non-transitory computer readable medium of claim 10, wherein the instructions cause the programmable circuitry to select the adjusted torque by providing the blended yaw rate signal as feedback to a closed loop controller.

17. A method comprising:
   determining a first yaw rate signal based on first signal data output by a yaw rate sensor of a vehicle;
   determining a second yaw rate signal based on second signal data output by a steering wheel angle sensor of the vehicle;
   determining a blended yaw rate signal based on the first yaw rate signal and the second yaw rate signal; and
   adjusting a torque to be applied by a motor of the vehicle based on the blended yaw rate signal.

18. The method of claim 17, further including filtering the first yaw rate signal and the second yaw rate signal based on a crossover frequency.

19. The method of claim 18, further including applying a low pass filter to the first yaw rate signal and applying a high pass filter to the second yaw rate signal, the low pass filter and the high pass filter corresponding to the crossover frequency.

20. The method of claim 19, further including determining the blended yaw rate signal by combining the filtered first yaw rate signal and the filtered second yaw rate signal.

* * * * *

UNITED STATES PATENT AND TRADEMARK OFFICE
CERTIFICATE OF CORRECTION

| | | |
|---|---|---|
| PATENT NO. | : 12,162,466 B1 | Page 1 of 1 |
| APPLICATION NO. | : 18/524858 | |
| DATED | : December 10, 2024 | |
| INVENTOR(S) | : Ashrit Das et al. | |

It is certified that error appears in the above-identified patent and that said Letters Patent is hereby corrected as shown below:

On the Title Page

Column 1, Applicant, replace "Ford Global Technologies" with --Ford Global Technologies, LLC--

Signed and Sealed this
Eleventh Day of March, 2025

Coke Morgan Stewart
*Acting Director of the United States Patent and Trademark Office*